United States Patent [19]
Gamet

[11] 3,948,577
[45] Apr. 6, 1976

[54] SPINDLE ASSEMBLIES FOR MACHINE TOOLS

[75] Inventor: Louis Jean Marie Gamet, Bougival, France

[73] Assignee: La Precision Industrielle, France

[22] Filed: Jan. 21, 1975

[21] Appl. No.: 542,787

[30] Foreign Application Priority Data
Jan. 31, 1974  France .............................. 74.03218

[52] U.S. Cl. .............. 308/207 A; 308/170; 308/228
[51] Int. Cl.² F16C 13/00; F16C 33/00; F16C 35/00
[58] Field of Search .......... 308/149, 169, 170, 228, 308/207

[56] References Cited
UNITED STATES PATENTS

| | | | |
|---|---|---|---|
| 1,922,589 | 8/1933 | Koepke | 308/170 |
| 2,410,388 | 10/1946 | Neal | 308/169 |
| 2,492,091 | 12/1949 | Berg | 308/228 |
| 2,558,308 | 6/1951 | Miller | 308/169 |
| 2,696,410 | 12/1954 | Topanelian, Jr. | 308/170 |
| 3,792,619 | 2/1974 | Cannon et al. | 308/228 |

*Primary Examiner*—Lloyd L. King
*Attorney, Agent, or Firm*—Stevens, Davis, Miller & Mosher

[57] ABSTRACT

A rotary spindle assembly for a machine tool including a spindle supported at opposite ends by oppositely directed roller bearings. The bearing at that end of the spindle opposite to the nose end is an outer race which is axially slidable in a housing, and a plurality of compression springs are arranged between the outer race and an annular thrust block to bias the outer race away from the axial center of the spindle. Elements are provided for varying the total biasing force on the outer race and the apparatus includes a regulator for controlling the force-varying elements. The force varying elements may be apparatus for applying hydraulic pressure to supplement the biasing force or apparatus for modifying the initial compression state of the springs. The axial force on the outer race reduces or eliminates play in the bearings.

14 Claims, 6 Drawing Figures

SPINDLE ASSEMBLIES FOR MACHINE TOOLS

This invention relates to a rotary spindle assembly for a machine tool and has for its object to provide an assembly which ensures stability of the spindle and also compensation of spindle length variations due to temperature changes in the assembly.

A rotary spindle assembly is known wherein the spindle is supported at its opposite ends by oppositely directed roller bearings. The bearing at that end of the spindle opposite to the nose end has an outer race which is axially slidable in a housing, and a plurality of compression springs are arranged between the outer race and an annular thrust block to bias the outer race away from the axial center of the spindle. Due to this pre-loading of this bearing, the rollers of both bearings are maintained in contact with the races thereof and this reduces or eliminates play in these bearings, particularly any play resulting from longitudinal expansion of the spindle due to heating. Due to the absence of play the spindle is very stable, thereby allowing work of high quality to be performed using the machine tool.

It has been found that the pre-loading supplied by these compression springs is sufficient to compensate for heat expansion of the spindle even at its highest running speeds. However, at low speeds and high torque the effect of the springs is not always sufficient to keep the spindle stable.

According to the present invention a rotary spindle assembly for a machine tool comprises a spindle having a nose end and an opposite end; a first conical roller bearing assembly supporting said nose end of said spindle; a second conical roller bearing supporting said opposite end of said spindle and tapering towards the axial center of said spindle; a housing for the outer race of said second bearing; a cylindrical extension from said outer race axially towards said axial center of said spindle, said outer race and said cylindrical extension being axially slidable in said housing; an annular thrust block; a plurality of compression springs arranged between said thrust block and said cylindrical extension to bias said outer race away from said axial center of said spindle; means for varying the total biasing force on said outer race; and regulating means for controlling said force-varying means.

By providing means by which the total biasing force on the outer race may be varied it is possible to ensure substantial stability of the spindle at all speeds and torques.

In a first embodiment of the invention said force-varying means comprises means for applying pressure, desirably hydraulic pressure, to said cylindrical extension, said pressure acting in the same direction as the biasing force due to the springs. Thus, the biasing force due to the springs may be supplemented by fluid pressure, the value of which is regulated as desired.

In a second embodiment the means for varying the total biasing force comprises means for adjusting the axial position of the thrust block relative to the cylindrical extension so that the initial compression state of the compression springs is modified. Furthermore, this arrangement may be such that after the springs are fully compressed the thrust block is in direct contact with the cylindrical extension so that the force exerted on the thrust block is directly transmitted to the cylindrical extension.

The thrust block may be moved axially by a drive motor connected to rotate a nut engaged with an externally threaded tubular extension of the thrust block. Alternatively the thrust block may be moved by the pressure of hydraulic fluid admitted to an annular space between the housing and a sleeve within the housing, the thrust block being slidably mounted in the annular space.

The total biasing force applied to the spindle can be regulated as a function of the torque applied to the spindle and the speed of the spindle, and the regulating means may be programmed to operate accordingly.

Preferably the end of the outer race which is remote from the axial center of the spindle has its external surface tapered inwardly towards the opposite end of the spindle. This assists in preventing jamming of the race within the housing due to radial expansion of the race as it is forced further away from the axial center of the spindle.

In order that the invention may be better understood specific embodiments thereof will now be described in more detail, by way of example only, with reference to the accompanying drawings in which.

Figure 1:
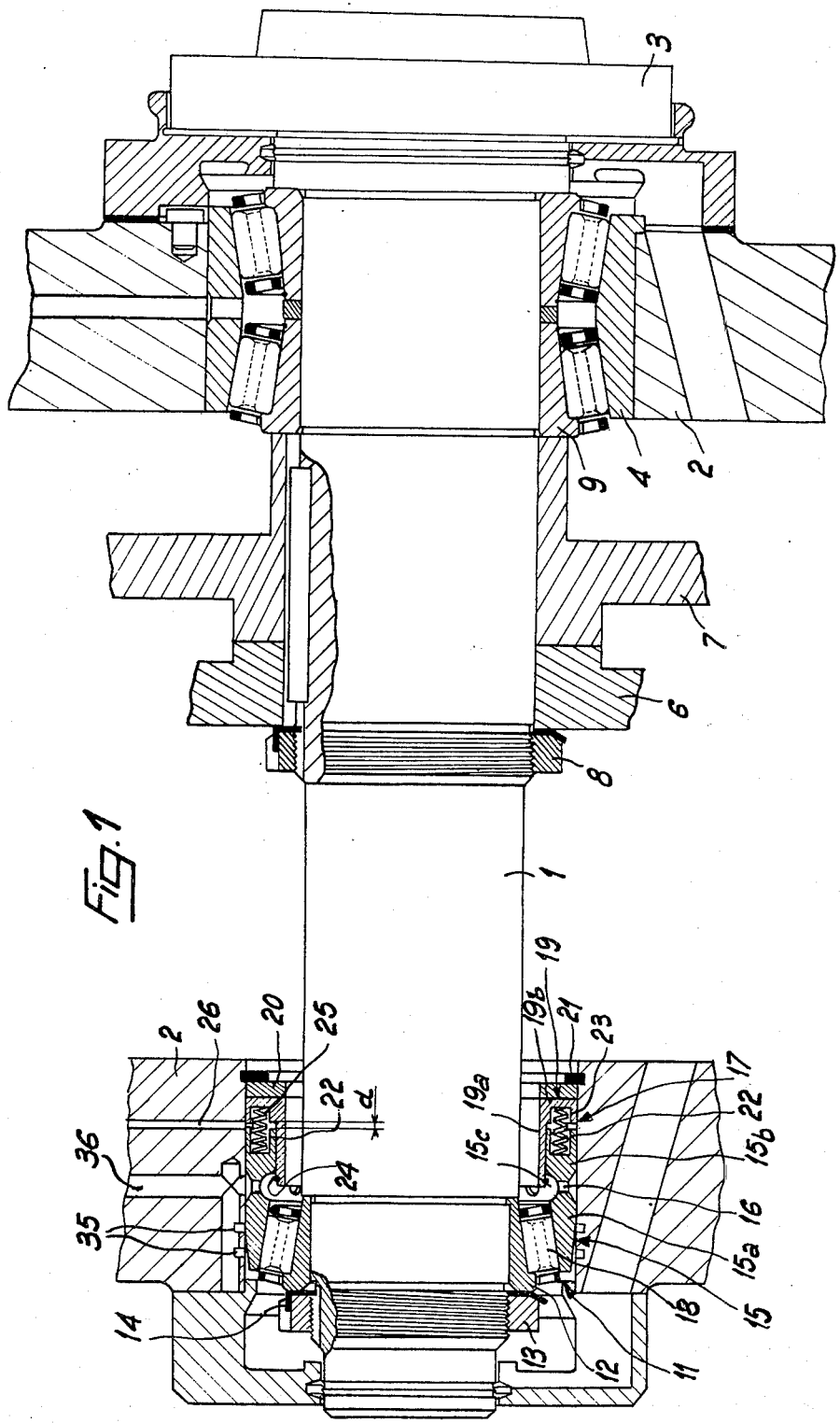
FIG. 1 is a cross-section through a first form of a rotary spindle assembly.

Referring now to FIG. 1 this shows the general arrangement of a first embodiment of a spindle assembly, comprising a spindle 1 mounted to rotate in a frame 2 of a machine tool. The nose end 3 of the spindle is supported by a double conical roller bearing 4. Driving pinions 6 and 7 are keyed to the spindle and are held in contact with the inner race 9 of bearing 4 by a retaining nut 8. The opposite end of the spindle is supported by a conical roller bearing 11, the conicity of which is opposite to that of the rollers nearest the nose end 3 of the spindle, i.e. the two extreme bearings both diverge towards the respective adjacent ends of the spindle. Bearing 11 has an inner race 12 which is held in contact with a shoulder of the spindle by a nut 13 held by a locking washer 14.

Bearing 11 has an outer race 15a which is joined to a cylindrical extension 15b by a center section 15c of reduced thickness, the center section being formed with radial holes 16 to increase the capacity for relative deformation between the race 15a and extension 15b. The bearing 11 also includes rollers 18 located between the two races 12 and 15a. The outer race 15a and cylindrical extension 15b are machined so as to slide without tolerance in a bore 17 in the housing formed by the machine tool frame. In order to facilitate this sliding movement, and to prevent jamming by corrosion, the race 15a slides in a portion of the bore which is formed with grooves 35 fed with oil from a channel 36 for lubricating the bearing 11.

A thrust block 19 is also positioned in the bore of the housing. The thrust block has a shoulder section 19b and an annular section 19a extending axially from such shoulder section away from the axial center of the spindle. The cylindrical extension 15b is slidably received between the annular section 19a and the bore in the housing. The cylindrical extension 15b and the shoulder section 19b are each formed with a plurality of facing blind holes 22 and 23 respectively and compression springs 25 are seated in these blind holes to act between the thrust block 19 and the cylindrical extension. The thrust block 19 is held in position in the housing by a spacer ring 20 and locking ring 21 engaged in a groove in the bore. The compression springs thus have the effect of biasing the cylindrical extension and thus the outer race 15a away from the axial center of the spindle. Seating the springs 25 in the blind holes enables long springs to be used, the force of which does not vary greatly when the spring expands or is compressed.

The maximum diameter of the outer race 15a can be made slightly less than the maximum diameter of the cylindrical extension 15b to allow some radial expansion of the outer race due to the wedge effect created by the rollers 18 as the outer race is moved away from the axial center of the spindle. Furthermore the cone angle of the rollers 18 is preferably small so that this also limits radial expansion and helps to prevent jamming of the outer race 15a in the housing.

In order to limit the movement of the cylindrical extension 15b away from the axial center of the spindle a locking ring 24 is located in a groove formed around the periphery of the annular section 19a of the thrust block 19.

The machine frame 2 is formed with a supply pipe 26 for pressurized fluid, and the pipe opens into the space between the shoulder section 19b and the cylindrical extension 15b so that oil under pressure may be supplied to this space. This pressure supplements the effect of the springs 25 to force the outer race away from the axial center of the spindle and press it into firm engagement with the rollers 18. This thrust leads to a reaction of equal and opposite value on the oppositely inclined bearing closest to the nose end of the spindle.

The biasing effect due to the springs alone is generally set so that the axial force applied to the outer race is at the minimum value which gives satisfactory operation of the spindle at the maximum speed of rotation and under low torque conditions. Under these conditions the pressure of any fluid in supply pipe 26 and the space between the shoulder section and the cylindrical extension is zero. However, when the spindle is rotating at low speed and high torque is applied the spindle stability is increased by raising the pressure of the oil transmitted by the supply pipe 26 and so increasing the axial force on the outer race. The following example gives an order of magnitude for the forces and pressures involved.

| | | |
|---|---|---|
| External diameter of bore 17 | mm : | 140 |
| External diameter of portion 19a of socket 19 | mm : | 115 |
| Active surface area receiving the oil pressure | cm² : | 50 |
| Minimum pre-loading (springs 25) | kg : | 50 |
| Maximum pre-loading (springs 25 + oil pressure) | kg : | 450 |
| Difference | kg : | 400 |
| Maximum regulating pressure (400/50) | bars : | 8 |

The thrust due to the pressure of the fluid in supply pipe 26 can be controlled by means of a pressure regulation valve and adjustment of this valve can be made dependent on the cycle of a machine tool in which the spindle assembly is incorporated. It is thus possible automatically to adjust the oil pressure in a manner that will ensure the optimum pre-loading on the spindle.

It will be seen that the geometry of the bearing 15 is maintained whatever variations may occur in the length of the spindle. This occurs because the three principle components of the bearing, i.e. the outer race, rollers and inner race all move axially together by equal distances so that the points of convergence of the generating lines of these members remains on the axis of rotation of the spindle.

In the embodiment shown in FIG. 1 the gap $d$ between the annular facing surfaces of the cylindrical extension 15b and the shoulder section 19b is preferably between 1 and 3 millimeters.

Figure 2:
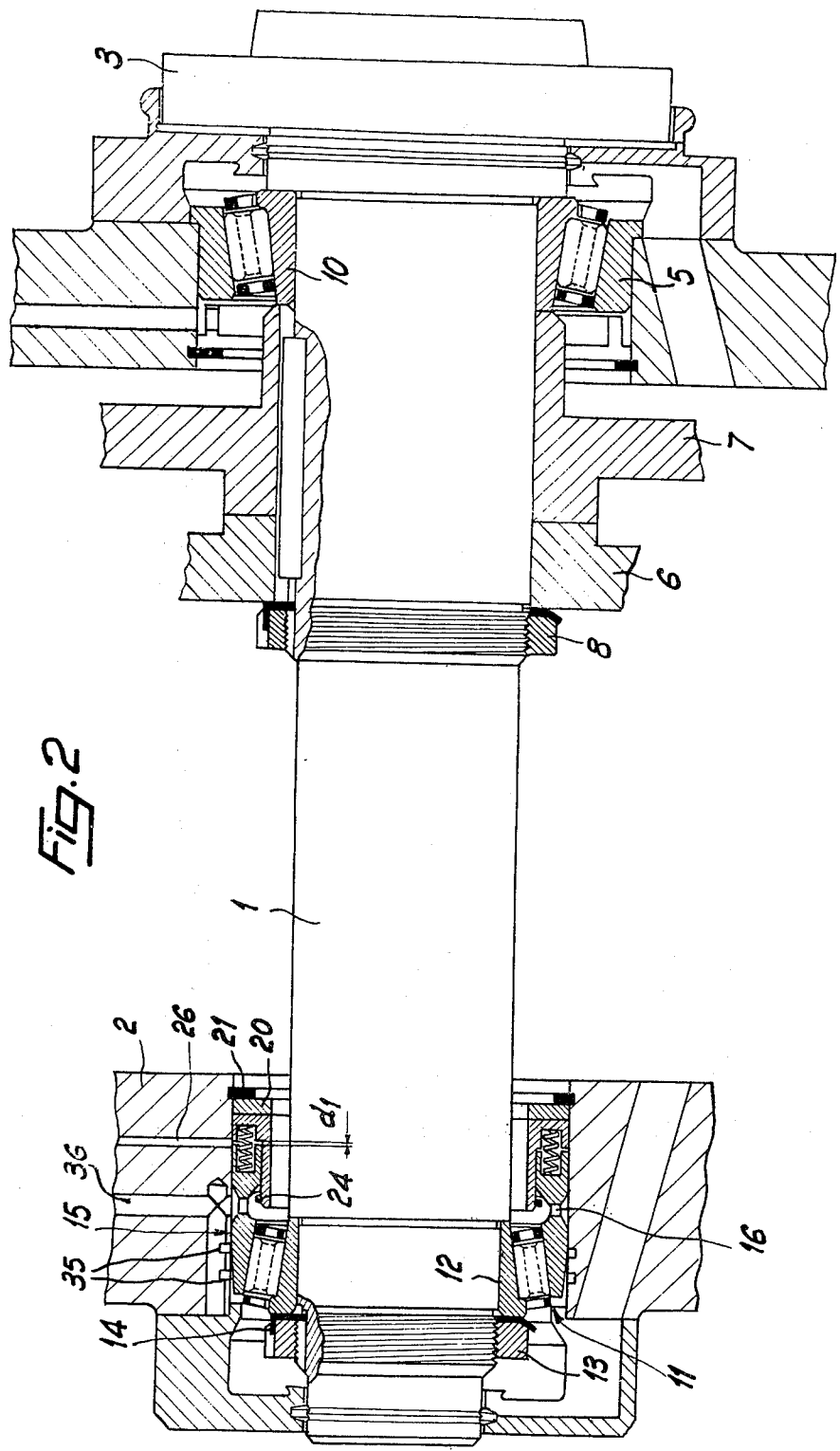
FIG. 2 is a cross-section through a second form of a rotary spindle assembly.

The embodiment shown in FIG. 2 is similar to that shown in FIG. 1 except that the nose end of the spindle is supported by a single bearing 10 having a conicity opposite to that of the bearing 11. In this embodiment there can be a danger of unsocketing the spindle by accidentally applying an axial force which is greater than and opposite to the biasing force applied by the compression springs 25. To reduce this possibility the gap $d_1$ is made smaller than the corresponding gap $d$ in the assembly shown in FIG. 1, and is preferably no greater than 0.1 millimeter.

In both the embodiments it is necessary for hydraulic leakage from the space between the shoulder section and cylindrical extension to be substantially constant in order that constant thrust is ensured for a given supply pressure. Thus the temperature in this space must vary little in order to avoid changes of vicosity or of size in the gaps between the relatively slidable members. Accordingly, the internal diameter of the thrust block is made substantially greater than the external diameter of that section of the spindle which is surrounded by the thrust block so as to reduce or avoid heat transmission from the spindle to the thrust block.

Furthermore the oil supply to channel 26 is preferably made independent of any other pressurized oil sources in the machine tool, or the temperature of the oil in channel 26 is regulated by a thermostat system.

Figure 3:
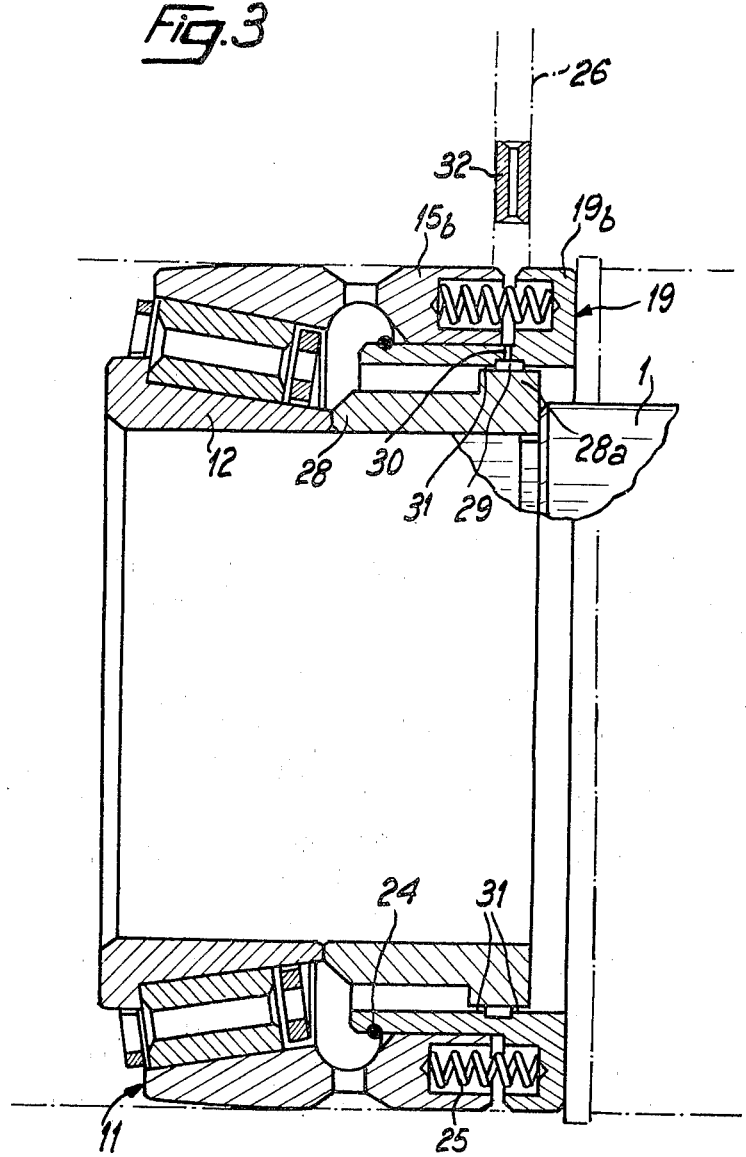
FIG. 3 shows an enlarged cross-section of part of a third embodiment of a spindle assembly.

FIG. 3 shows an alternative arrangement wherein the hydraulic pressure added to the biasing force of the springs varies automatically in accordance with the spindle speed, the temperature of the spindle being utilized to effect such variation. In this arrangement the spindle is fitted with a ring 28 having a collar 28a and the ring is held on the spindle between a shoulder and the inner race 12 of the bearing 11. The annular section 19a of the thrust block is formed with one or more holes 30 opening into a groove 29 adjacent to the collar 28a. Thus a leakage path is formed from the space between the thrust block and the annular extension to the space between the ring 28 and the annular extension. This leakage path includes annular gaps 31 located to each side of the groove 29, and the width of these gaps is made very small, for example from 0.01 to 0.03 millimeter. A restricting element 32 is included in the supply pipe 26 and is designed so that the pressure drop over the restricting element is substantially equal to the pressure drop over the aforesaid leakage path when the apparatus is stationary. Thus, when fluid at a pressure P is supplied to supply pipe 26 a pressure substantially equal to half P will exist in the space between the shoulder portion 19b and annular extension 15b.

This arrangement functions as a rotary pressure transfer joint. At low speeds of rotation of the spindle the flow rate of fluid through the joint increases only slightly from the flow rate at rest, so that the effective pressure assisting the springs remains close to the value of half P. As the speed of the spindle rises the temperature of the transfer joint increases so increasing the oil temperature and the shearing stress applied to the oil in the region of the joint also increases. The flow rate of oil through the joint thus increases so that the pressure assisting the force of the springs drops. At maximum speed the oil leakage is such that the pressure assisting the springs becomes negligible, so that effectively the outer race of the bearing 11 is biased only by the force of the springs. The oil leaking through the transfer joint is recovered for lubricating the bearing 11.

Figure 4:
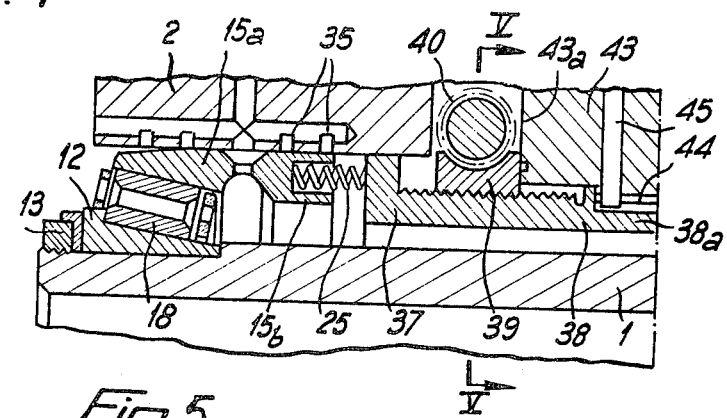
FIG. 4 shows an enlarged cross-section of part of a fourth embodiment of a spindle assembly.
Figure 5:
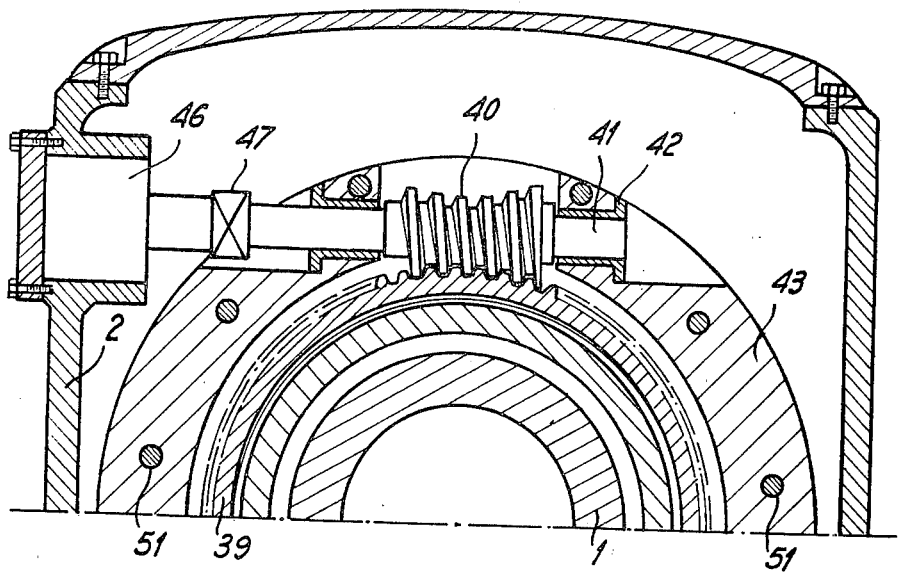
FIG. 5 is a cross-section along the line V—V of FIG. 4.
Figure 6:
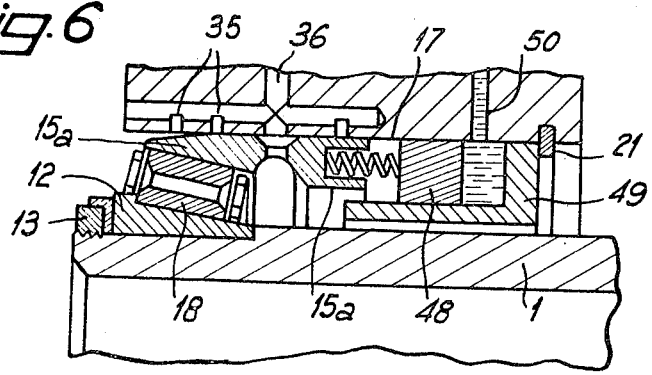
FIG. 6 is a cross-section similar to FIG. 4 showing a fifth embodiment of a spindle assembly.

FIGS. 4 to 6 show two embodiments of a spindle assembly wherein the pre-load on the outer race may be initially adjusted by regulating the state of compression of the springs 25.

In the case of the embodiment shown in FIGS. 4 and 5 the thrust block 37 has an externally threaded tubular extension 38 extending towards the axial center of the spindle, and a nut 39 is engaged with the threaded extension. The external periphery of the nut 39 is toothed in the manner of a worm wheel and meshes with a worm 40 on a shaft 41 mounted in bearings 42 fixed in a bearing ring 43 which is secured to the frame by screws 51. An end 38a of the extension 38 slides in a reduced diameter bore 44 of the bearing ring 43, and a finger 45 engages an axially extending groove in the end 38a to prevent rotation of the thrust block 37 when the nut is rotated. The springs 25 press the nut 39 against a face 43a of the bearing ring 43, and an anti-friction thrust bearing can be incorporated at this interface to facilitate rotation of the nut. The shaft 41 is driven by a motor 46, which is preferably a stepping motor so that axial movement of the thrust block can be digitally controlled. The motor 46 may be mounted on an opening in the frame 2 or on an extension placed adjacent to the bearing ring 43 and for safety reasons the shaft 41 may be driven from the motor by way of a torque limiter 47.

In this arrangement the springs 25 are preferably relatively short and taut, so that quite a small variation in their length makes it possible to bring about a substantial modification in the axial thrust which they impose on the outer race. When the springs are compressed to the extent of being entirely enclosed in the blind holes formed in the cylindrical extension 15b the thrust of the thrust block 37 is transmitted directly to the annular extension 15b. The torque limiter 47 can be calibrated so as to yield when the maximum admissible pre-load is obtained.

In the embodiment shown in FIG. 6 the thrust block 48 is slidably mounted in an annular space formed between a sleeve 49 and the bore of the housing. A supply pipe 50 through the frame leads to this annular space so that fluid under pressure can be supplied to and exhausted from the space to control the axial position of the thrust block 48. Once again the thrust block may compress the springs completely and then the load on the outer race is exactly equal to the thrust applied to the thrust block 48 by the fluid under pressure.

In all embodiments of the invention the springs 25 continue to bias the outer race away from the axial center of the spindle so that the race is maintained in position even if there is a failure of the pressurized oil supply. Furthermore the springs prevent floating of the spindle when the machine is started up or shut down.

It will be appreciated that the degree of radial expansion of the outer race 15a can vary considerably as the race is moved axially. To assist in preventing the race from jamming in the housing the end thereof that is remote from the axial center of the spindle has its external surface tapered inwardly away from the axial center of the spindle as shown in exaggerated fashion in the drawings. The gradient of the generatrix of this tapered external section relative to the axis of the spindle is advantageously from one in three thousand to one in five thousand.

There is no need for any gasket between the bore 17 and either the outer race 15a or the thrust block 19. Gaskets could act to prevent the very small relative displacements of these portions resulting from variations in the length of the spindle. Furthermore the hydraulic leakages between the bore 17 and the race 15a and between this race and the thrust block aid lubrication of the bearing, facilitate the relative sliding movement and prevent contact oxidation. In fact this leakage may be sufficient to enable grooves 35 to be dispensed with.

Spindle assemblies according to the invention may be applied to any machine tool which utilizes a rotary spindle, and are particularly suitable for use in lathes wherein high torques are imposed on the spindle.

What we claim is:

1. A rotary spindle assembly for a machine tool, the assembly comprising a spindle having a nose end and an opposite end; a first conical roller bearing assembly supporting said nose end of said spindle; a second conical roller bearing having an outer race and supporting said opposite end of said spindle and tapering towards the axial center of said spindle; a housing for the outer race of said second bearing; a cylindrical extension extending from said outer race axially towards said axial center of said spindle, said outer race and said cylindrical extension being axially slidable in said housing; an annular thrust block surrounding said spindle; a plurality of compression springs arranged between said thrust block and said cylindrical extension to bias said outer race away from said axial center of said spindle; and fluid pressure means for applying an adjustable biasing force on said outer race, said biasing force acting thereon in the same direction as said compression springs.

2. A rotary spindle assembly as claimed in claim 1 wherein said fluid pressure means is adapted for applying hydraulic pressure to said cylindrical extension.

3. A rotary spindle assembly as claimed in claim 2 wherein said thrust block has a shoulder section on which said springs bear, and annular section extending axially from said shoulder section away from said axial center of said spindle, and said cylindrical extension is slidably disposed between said annular section and said housing; and said assembly includes a supply pipe for pressurized fluid, said supply pipe communicating with a space between said shoulder section and said cylindrical extension.

4. A rotary spindle assembly as claimed in claim 3 wherein said shoulder section of said thrust block and said cylindrical extension are each formed with facing blind holes, and said springs are seated in said blind holes.

5. A rotary spindle assembly as claimed in claim 3 wherein a section of reduced thickness connects said outer race to said cylindrical extension, and including a locking ring, said locking ring being seated in a groove formed around the periphery of said annular section of said thrust block to limit movement of said cylindrical extension away from said axial center of said spindle.

6. A rotary spindle assembly as claimed in claim 3 wherein said first conical roller bearing assembly comprises a double conical roller bearing and the axial width of said space between said shoulder section and said cylindrical extension is from 1 to 3 millimeter.

7. A rotary spindle assembly as claimed in claim 3 wherein said first conical roller bearing assembly comprises a single conical roller bearing tapering towards said axial center of said spindle and the minimum axial width of said space between said shoulder section and said cylindrical extension is no greater than 0.1 millimeter.

8. A rotary spindle assembly as claimed in claim 3 wherein said space between said shoulder section of said thrust block and said cylindrical extension is in communication with a space between said annular section of said thrust block and said spindle by way of a restricted passage.

9. A rotary spindle assembly as claimed in claim 8 wherein a restricting element is included in said supply pipe, and the pressure drop occasioned by said restricting element is substantially equal to the pressure drop occasioned by said restricted passage.

10. A rotary spindle assembly as claimed in claim 3 wherein the internal diameter of said thrust block is substantially greater than the external diameter of that section of said spindle which is surrounded by said thrust block.

11. A rotary spindle assembly as claimed in claim 1 wherein a sleeve is mounted within said housing, said sleeve forming with said housing an annular space in which said thrust block is slidably mounted, and means are further provided for supplying fluid under pressure to said annular space and for exhausting fluid from said annular space.

12. A rotary spindle assembly as claimed in claim 1 wherein the end of said outer race remote from said axial center of said spindle has its external surface tapered inwardly towards said opposite end of said spindle.

13. A rotary spindle assembly as claimed in claim 12 wherein the gradient of the generatrix of said tapered external section relative to the axis of said spindle is from 1 in 3000 to 1 in 5000.

14. A rotary spindle assembly as claimed in claim 1 further comprising a machine tool coupled to said spindle.

* * * * *